United States Patent [19]

Itoh et al.

[11] Patent Number: 4,876,298

[45] Date of Patent: Oct. 24, 1989

[54] EPOXY RESIN COMPOSITION

[75] Inventors: Kunio Itoh; Toshio Shiobara, both of Annaka, Japan

[73] Assignee: Shin-Etsu Chemical Co., Ltd., Tokyo, Japan

[21] Appl. No.: 201,439

[22] Filed: Jun. 2, 1988

[30] Foreign Application Priority Data

Jun. 3, 1987 [JP] Japan ................................. 62-139447

[51] Int. Cl.[4] .................. C08K 3/36; C08L 83/10; C08L 63/04; C08L 63/00
[52] U.S. Cl. .................................... 523/433; 523/435; 523/466; 525/476; 525/482; 525/487; 525/488; 525/490; 525/500; 525/529; 525/531; 525/502; 525/922
[58] Field of Search ................ 523/435, 433, 466; 525/529, 537, 476, 482, 487, 488, 490, 500

[56] References Cited

U.S. PATENT DOCUMENTS 4,376,174 3/1983 Itoh et al. ........................ 523/456
4,720,515 1/1988 Iji et al. ............................ 523/435

FOREIGN PATENT DOCUMENTS 56-163120 12/1981 Japan ............................... 523/435
58-021417 2/1983 Japan .
63-183917 7/1988 Japan ............................... 523/435

Primary Examiner—Lewis T. Jacobs
Attorney, Agent, or Firm—Birch, Stewart, Kolasch & Birch

[57] ABSTRACT

An epoxy resin composition which is adapted for use as an encapsulator of electronic or electric parts and which comprises an epoxy resin and a curing agent for the epoxy resin. A modified polymer obtained by reaction between an aromatic polymer and a fluorine-containing material is added to the epoxy resin, so that good characteristic properties are imparted to the resultant cured product.

8 Claims, No Drawings

EPOXY RESIN COMPOSITION

BACKGROUND OF THE INVENTION

1. Field of the Invention

This invention relates to epoxy resin compositions and more particularly, to epoxy resin compositions capable of yielding cured products which have not only good mechanical, electrical and waterproofing characteristics, but also a low stress property, a good crack resistance and a low moisture absorption without lowering a glass transition point and which are particularly suitable for encapsulating or packaging electronic and electric parts.

2. Description of the Prior Art

The resins currently used for encapsulating or packaging electronic or electric parts are thermosetting or thermoplastic resins including, for example, epoxy resins, silicone resins polybutadiene, polyurethanes, phenolic resins and the like. These resins are selectively used depending upon the manner of application or the purpose.

Among these resins, the epoxy resins have widely used in large amounts because of their good mechanical and electrical characteristics, heat resistance, adhesiveness and moldability. For encapsulators of semiconductor elements such as diodes, transistors, ICs, LSIs and the like, which are technically advanced drastically in recent years, the epoxy resins outrival the other resins in view of the better characteristics.

However, since the current tendency of the electronic parts is to make them thinner or smaller in size with an increasing degree of integration, the characteristics required for encapsulators become more severe. Under these circumstances, existing epoxy resins are not necessarily satisfactory.

The characteristics required as encapsulators for the recent semiconductor elements include a higher purity, higher electric characteristics, a more shortened molding cycle ensuring improved productivity, a higher heat transmittance for heat dissipation, a low stress property for mitigating a physical stress on the elements, and a better crack resistance sufficient to suffer a severe heat cycle or shock.

In order to improve these characteristics, the present inventors proposed in Japanese Patent Publication Nos. 60-56171 and 61-48544 epoxy resins in which organopolysiloxanes or copolymers of organopolysiloxanes and aromatic polymers are formulated.

However, the improvement of the characteristics can be realized by the above proposed resin compositions, but a further improvement is desirable so as to satisfy the recent severe requirements. In recent years, as the package is made thinner, it is not unusual to adopt a method of immersing a package itself in a solder melt. In this method, when the package absorbing moisture is subjected to soldering, the moisture in the resin may instantaneously vaporize to break the package. In this sense, it is required to have a low moisture absorption characteristic.

SUMMARY OF THE INVENTION

It is accordingly an object of the invention to provide an epoxy resin composition which can meet the above requirements without a sacrifice of other characteristics.

It is another object of the invention to provide an epoxy resin composition which has good characteristics required as an encapsulator for electronic parts, and has particularly a low stress property, good water repellency, low moisture absorption and a good heat resistance.

It is a further object of the invention to provide an epoxy resin composition which is particularly useful as an encapsulator for electronic or electric parts.

The present invention is based on the finding that various characteristics required as encapsulators can be significantly improved by dispersing or co-crosslinking by dispersing, in an epoxy resin, a modified polymer obtained by reaction an aromatic polymer and a monomer, oligomer or polymer having one or more of fluorine atoms in one molecule.

It is known that an epoxy resin composition in which a fluorine polymer powder is dispersed has a low stress property and improved moldability. However, this composition is disadvantageous in that the fluorine polymer is so low in solubility in the epoxy resin that it is apt to gradually move toward the surface of a molded product as the time goes.

In contrast, the modified polymer formulated in the composition of the invention is a product which is obtained by reaction between an aromatic polymer and a monomer, oligomer or polymer having at least one fluorine atom in one molecule. Since the aromatic polymer is used, the modified polymer has an appropriately controlled degree of miscibility with the epoxy resin. When the modified polymer is formulated in an epoxy resin comprising an epoxy resin and a curing agent, the resultant cured product has a low stress property and a good crack resistance as required for encapsulating or packaging electronic or electric parts, and a small moisture absorption and a good heat resistance. In addition, the product has also excellent mechanical and electrical characteristics. Thus, this epoxy resin composition is suitable for encapsulating or packaging electronic and electric parts.

According to the invention, there is provided an epoxy resin composition comprising an epoxy resin, a curing agent for the epoxy resin, and a modified polymer obtained by reaction between an aromatic polymer and a member selected from the group consisting of monomers, oligomers and polymers each having at least one fluorine atom in one molecule, the modified polymer being preferably used in an amount of from 1 to 100 parts by weight per 100 parts by weight of the total of the epoxy resin and the curing agent.

DETAILED DESCRIPTION OF THE INVENTION

The epoxy resins used in the composition of the invention may be various epoxy resins known in the art and are not critical with respect to the molecular structure and the molecular weight so far as they are those which have two or more epoxy groups in one molecule and are curable by the use of various curing agents set forth hereinafter. More specifically, the epoxy resins include epoxy novolac resins obtained from epichlorohydrin and various novolac resins such as phenol novolac resins, alicyclic epoxy resins, epoxy resins introduced with halogen atoms such as chlorine or bromine, and the like. Among them, epoxy novolac resins are preferred. Specific examples include those of the following formulae

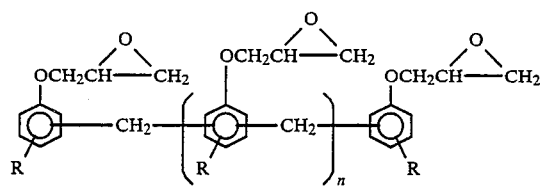

(R represents hydrogen atom or methyl group, and n is an integer of 0 to 20, preferably 1 to 8.)

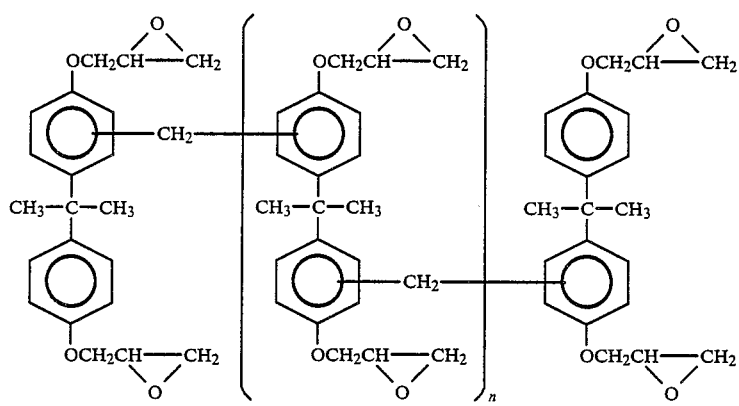

(n is an integer of 0 to 10, preferably 1 to 3.)

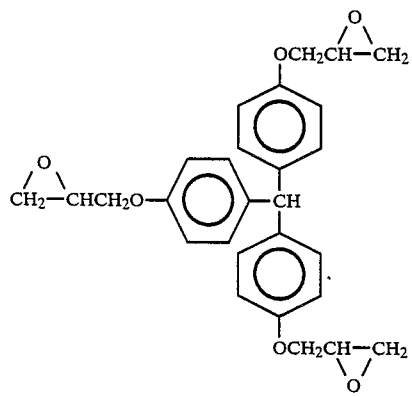

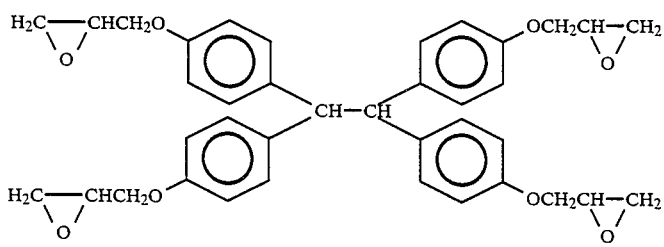

These epoxy resins may be used singly or in combination.

The curing agents for the epoxy resin are not critical and various types of curing agents may be used for this purpose. For instance, there are mentioned amine curing agents such as diaminodiphenylmethane, diaminodiphenylsulfone, methaphenylenediamine and the like, acid anhydride curing agents such as phthalic anhydride, pyromellitic anhydride, benzophenonetetracarboxylic anhydride and the like, and phenol novolac curing agents having two or more hydroxyl groups such as phenol novolac, cresol novolac and the like. The curing agent should be used in an amount sufficient to cause the epoxy resin to be cured, and the curing agent may preferably be used in an amount such that the molar ratio of the epoxy group of the epoxy resin and the functional group of the curing agent is 0.5 to 2.

The modified polymers consisting of an aromatic polymer and a monomer, oligomer or polymer having at least one fluorine atom in the molecule is an ingredient which is effective in imparting desirable properties, i.e. a low stress property, a low moisture absorption and water repellency, to the epoxy composition.

The preferred aromatic polymers used to obtain the modified polymer are novolac resins, epoxy resins, epoxy novolac resins, epobis type epoxy resins and the like, and include, for example, the compounds of the following formulae, but it should not be construed as limiting the aromatic polymers to these compounds:

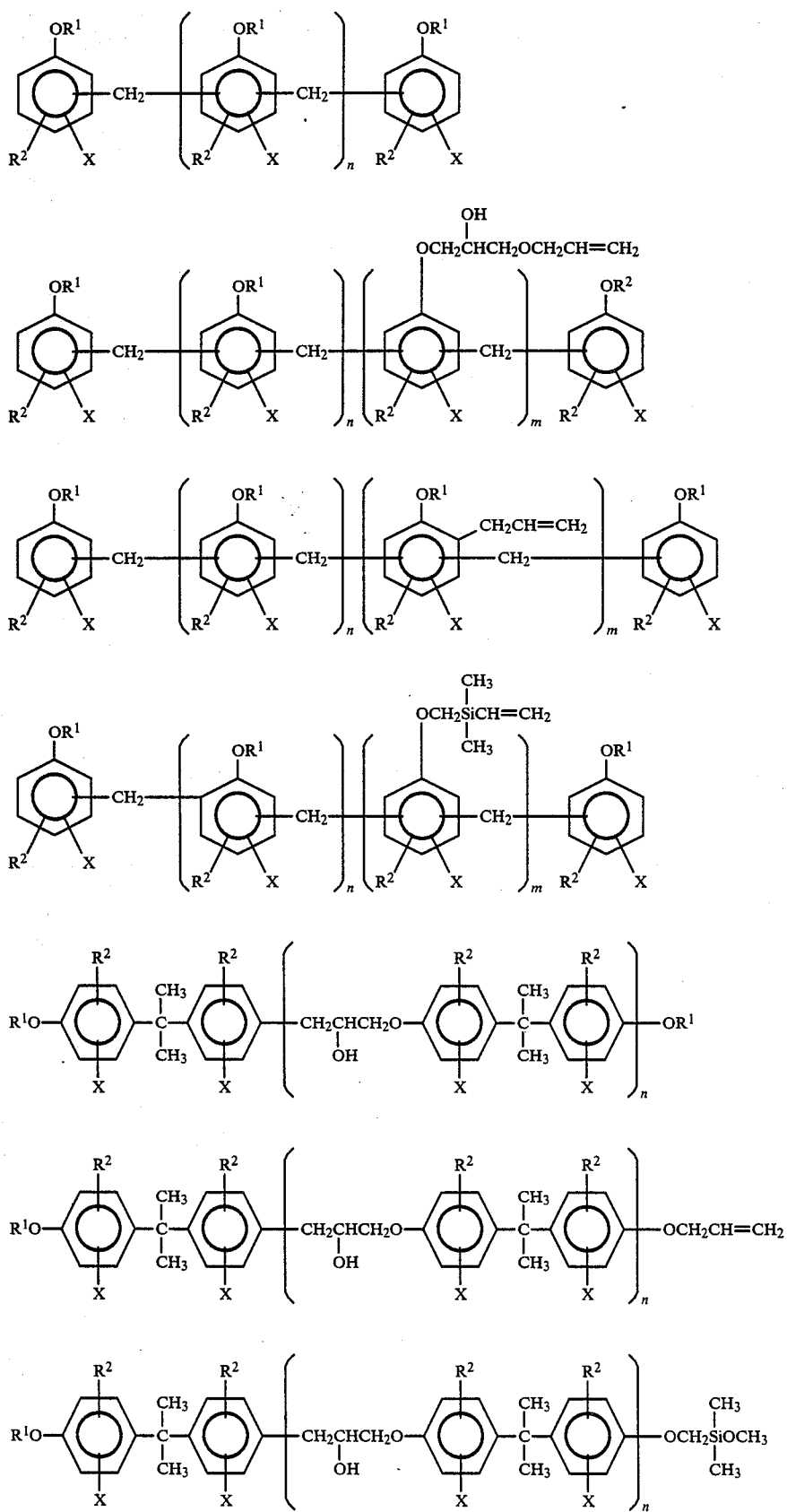

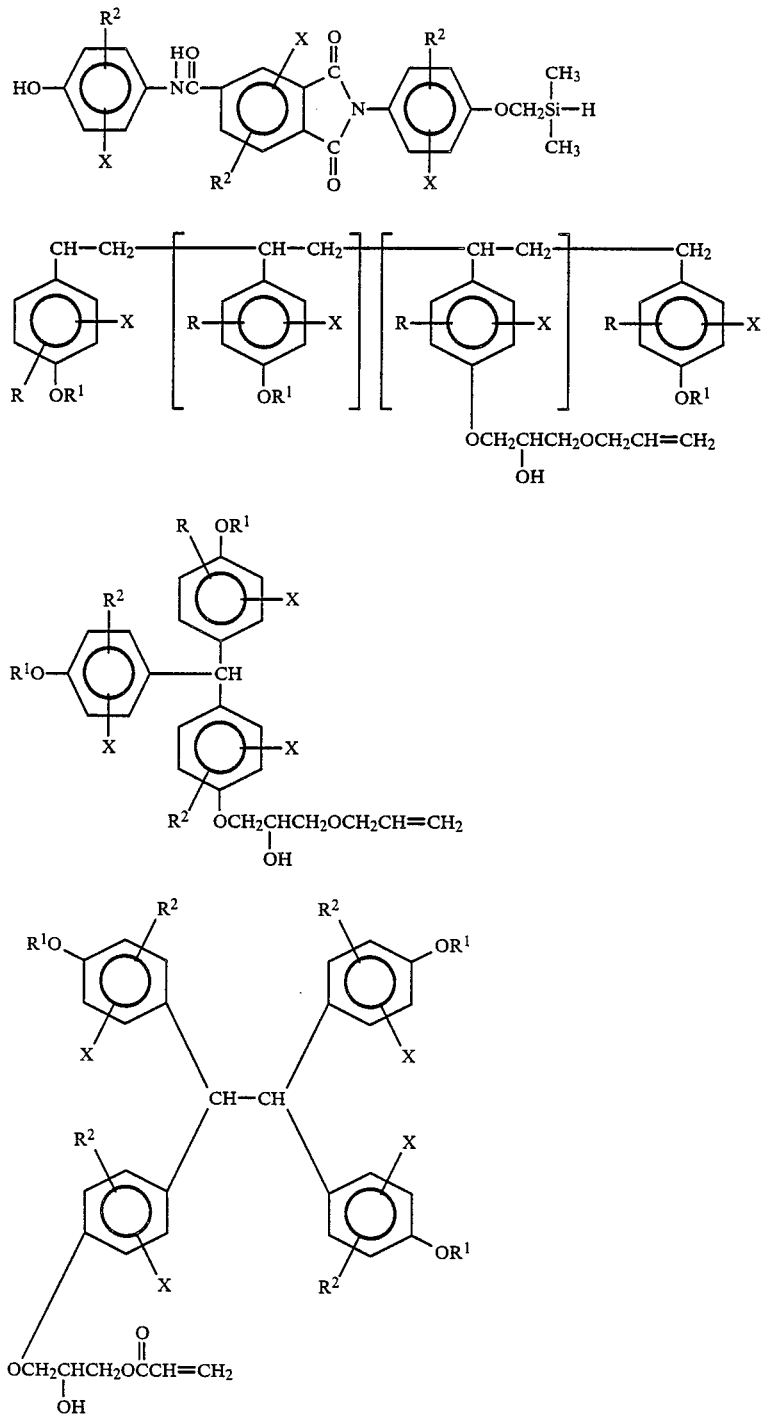

In these formulae, each $R^1$ is a hydrogen atom or

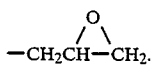

$R^2$ represents a hydrogen atom or a monovalent organic group having from 1 to 10 carbon atoms, such as a methyl group, an ethyl group, a propyl group, an isopropyl group, a t-butyl groups, a phenyl group, a tolyl group or the like, X represents a hydrogen atom or a halogen atom. n is an integer of 0 to 20, preferably 1 to 8, and m is an integer of 1 to 5, preferably 1 to 2.

The preferred monomers, oligomers or polymers having at least one fluorine atom in the molecule are those having 1 to 50, preferably 5 to 15, of a polymerization degree of fluoroalkylene repeated structural units or fluoroalkylene ether repeated structural units, and those having 1 to 200, preferably 20 to 100, of a polymerization degree of fluoroalkylorganosiloxy units or ethermodified fluoroalkylorganosiloxy units. They are, for example, those having functional groups for the modification. These are not limitative but are illustrative only.

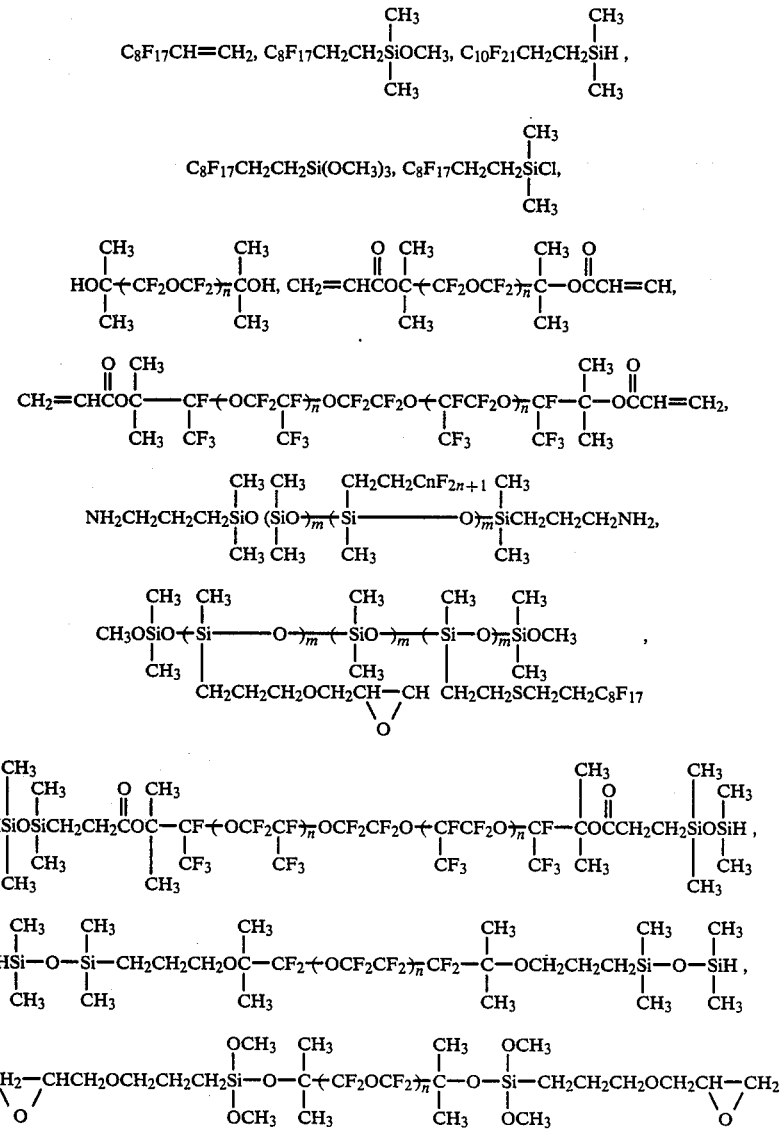

In these formulae, n is an integer of 1 to 50, preferably 5 to 15, and m is an integer of 1 to 200, preferably 20 to 100. Of these, oligomers having the units of the following formulae with reactive end groups are preferred,

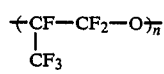

in which n is an integer of 1 or more, preferably 3 to 50, more preferably 5 to 15, and

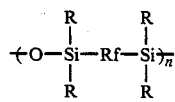

in which Rf is a fluoroalkylene or a fluoroalkylene ether each having 1 to 600 fluorine atoms, preferably 24 to 200 fluorine atoms and 4 to 300 carbon atoms, preferably 12 to 100 carbon atoms, each R is a hydrocarbon group having 1 to 10 carbon atoms, preferably 1 to 6 carbon atoms such as an alkyl, phenylvinyl, trifluoropropyl or the like, and n is an integer of 1 or more, preferably 1 to 5, more preferably 1 to 3.

The content of the fluorine compound in the modified polymer may vary depending upon the degree of polymerization of a fluorine compound, the content of fluorine, and the mixing ration of the aromatic polymer and the fluorine compound, and is generally in the range of from 10 to 80% by weight, more preferably 20 to 60% by weight.

The reaction between the aromatic polymer and the monomer, oligomer or polymer having at least one fluorine atom in the molecule may be effected by various reaction processes. Typical reactions are described below.

(a) Modification by reaction between epoxy groups and active hydrogen-containing functional groups.

(b) Modification by radical polymerization or ion polymerization among unsaturated double bonds.

(c) Modification by hydrosilylation between unsaturated groups and hydrogen atoms bonded to silicon atoms.

(d) Modification by condensation reaction between hydroxyl groups and silyl groups having a hydrolyzable group.

(e) Modification by optical addition reaction between unsaturated double bonds and thiole groups.

It should be noted that the reaction is not limited to those mentioned above.

The reaction may be effected between at least one aromatic polymer indicated above and at least one of the monomers, oligomers and polymers indicated above.

It is preferred that the reaction between the aromatic polymer and the monomer, oligomer or polymer having at least one fluorine atom in the molecule is effected prior to mixing with the epoxy resin composition to obtain a modified polymer. In some cases, however, the aromatic polymer and the monomer, oligomer or polymer having at least one fluorine atom in the molecule may be pre-mixed in an epoxy resin composition and reacted simultaneously with the molding of the epoxy resin composition.

Preferably, the modified polymer has at least one reactive functional group in order to inhibit the modified polymer from transferring to the surface of a molded article. The reactive functional groups are not critical with respect to the type if the groups are reactive with epoxy resins, and amine, phenol or acid anhydride curing agents. Preferably, functional groups are those containing active hydrogen, such as an epoxy group, an amino group, a phenolic hydroxyl group, a carboxyl group, a thiole group and the like.

The amount of the modified polymer is preferably in the range of from 1 to 100 parts by weight, more preferably from 1 to 50 parts by weight, based on 100 parts by weight of the total of an epoxy resin and a curing agent used. If the amount of the modified polymer is less than 1 part by weight, it may become difficult, in some case, to impart a good crack resistance, a low stress property, good water repellency and a low water absorption. Over 100 parts by weight, the crack resistance, stress property and water repellency are imparted, but a disadvantage is produced in that because of the lowering of a crosslinking density, a lowering of mechanical strength and a large moisture absorption will result.

The epoxy resin composition of the invention may further comprise inorganic fillers. Typical examples of the inorganic filler include crystalline or non-crystalline silica The silica includes ultrafine silica powder having an average size of from 1 to 30 micrometers and commercially available under the designations of Aerosil (Degussa Co., Ltd.), Cab-O-sil (Cabot Co., Ltd.), Ultrasil (Degussa Co., Ltd.) and the like, and crystalline or non-crystalline quartz powder having an average size of from 1 to 30 micrometers and available under the designations of Celite (Johnman Bill Co., Ltd.) and Imsil (Illinois Mineral Co., Ltd.). In general, although ultrafine silica powder has a good reinforcing property, it considerably increases the viscosity, with the fear that the fluidity is impeded. For casting or molding, choice of quartz powder is preferred, by which good characteristics can be imparted.

Depending upon the manner of application and purpose of the composition of the invention, fillers other than silica may be used. Examples of such fillers include talc, mica, clay, kaolin, calcium carbonate, alumina, zinc flower, barytes, glass balloons, glass fibers, aluminium hydroxide, calcium hydroxide, asbestos, titanium oxide, iron oxide, carbon black, graphite, wollastonite and the like.

These fillers may be used singly or in combination.

The amount of the inorganic filler is preferably used in an amount of from 150 to 400 parts by weight per 100 parts by weight of the total of an epoxy resin, a curing agent and a modified polymer used. Over 400 parts by weight, not only the dispersion becomes difficult, but also satisfactory results may not be obtained with respect to the workability, low stress, crack resistance and the like.

The epoxy resin composition may further comprise various additives in amounts not impeding the characteristic properties of the composition. Examples of such additives include releasing agents such as fatty acids, waxes and the like, colorants such as carbon black, coupling agents such as epoxysilanes, vinylsilanes, boron compounds, alkyl titanates and the like, flame retarders such as antimony compounds, and various curing accelerators for promoting the reaction between curing agents and epoxy resins such as, for example, imidazole derivatives, tertiary amine derivatives, phosphate derivatives, cycloamidine derivatives and the like. Further, in order to impart a lower stress property, powders of silicon rubbers or gels, and reaction products of silicones and aromatic polymers may be added.

The composition of the invention may be uniformly mixed by a dry kneading, melt kneading or solution method using rolls, kneaders, screwtype continuous kneaders. The mixture may be used as a molding compound used for compression, transfer or injection molding, or may be subjected to a variety of molding techniques for liquid, solution or powder coating or as a potting material. The molding conditions may vary upon the molding procedures, etc. For example, molding temperature may be 150° to 180° C., molding pressure may be 50 to 150 kg/cm$^2$, and molding time may be 1 to 5 minutes for transfer molding. Post curig may be conducted at 150° to 200° C. for 2 to 16 hours.

The cured product obtained from the epoxy resin composition of the invention has a good crack resistance, a low stress property, good water repellency, low moisture absorption and a good heat resistance. Thus, the composition is not only applied as an encapsulator for electronic or electric parts, but also for various painting, casting, molding, electric-insulating and laminating purposes.

The present invention is described more particularly by way of examples which should not be construed as limiting the invention. A comparative example is also shown.

EXAMPLES 1–7 and Comparative Example

There were provided an epoxy cresol novolac resin (EOCN 1020 available from Nippon Kayaku K.K.) as an epoxy resin, a phenol novolac resin (TD 2093 available from Dainippon Inc Co., Ltd.) as a curing agent, a brominated epoxy resin (BREN available from Nippon Kayaku K.K.), antimony trioxide (K type from Sumitomo Kinzoku Kozan K.K.), carnauba wax, carbon black, triphenylphosphine, γ-glycidoxypropyltrimethoxy silane as a silane coupling agent (KBM 403 available from Shin-Etsu Chem. Co., Ltd.), and fluorine-containing modified resins indicated below. The mixtures were kneaded to obtain eight epoxy resin compostions of Examples 1–7 and Comparative Example. Fluorine-containing Aromatic Modified Polymers:

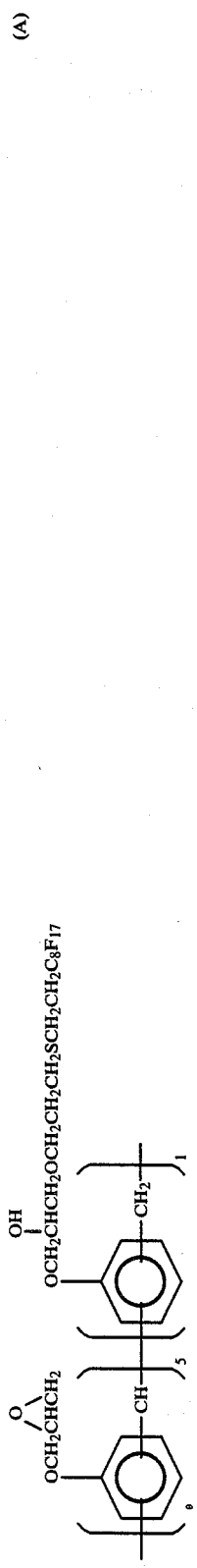
(A)
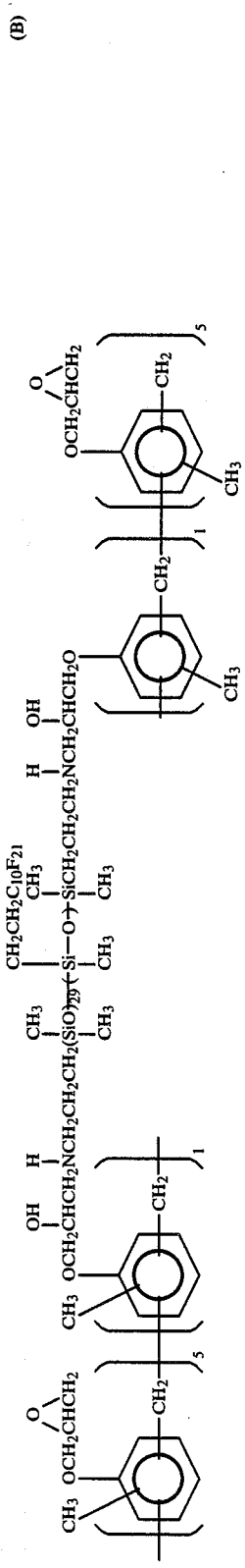
(B)
(C)
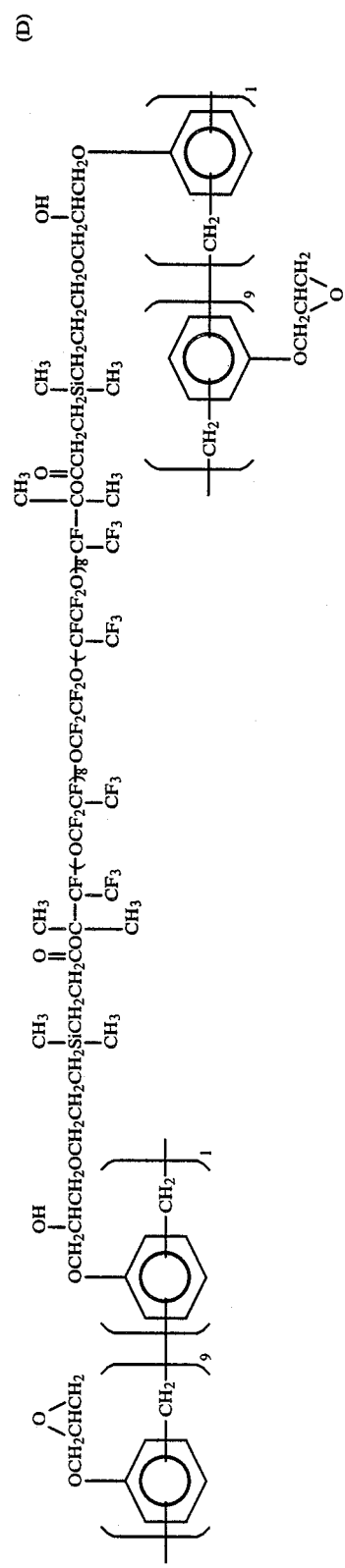
(D)

Subsequently, the respective epoxy resin compositions were subjected to measurements of spiral flow, mechanical strength (bending strength), glass transition temperature, expansion coefficient, water absorption and crack resistance using conditions and methods indicated below. The results are shown in Table below. It will be noted that for the measurements of the mechanical strength (bending strength), glass transition temperature, expansion coefficient and water absorption, a molded article obtained by transfer molding of each epoxy resin composition at a temperature of 160° C. and a pressure of 70 kg/cm² was used.

Measurement of mechanical strength (bending strength):

A bar having a width of 10 mm, a length of 100 mm and a thickness of 4 mm was molded according to the method prescribed in JIS K 6911 under conditions of a molding temperature of 160° C., a molding pressure of 70 kg/cm² and a molding time of 3 minutes, followed by post curing in a thermostatic chamber of 180° C. for 4 hours to obtain a test piece.

Measurement of glass transition temperature:

Square pillars having a size of 5 mm in square and a length of 20 mm were cut from the test piece for the measurement of the bending strength and were subjected to measurement of a linear expansion by the use of Dictometer of Sinku Rikou K.K. under conditions where the temperature was increased at a rate of 5° C. per minute. The glass transition temperature was determined at a temperature at which the linear expansion varied. Measurement of linear expansion coefficient:

The test piece used for the measurement of the bending strength was used and subjected to measurement according to the method prescribed in ASTM D 696.

Measurement of water absorption:

A disk having a thickness of 2 mm and a diameter of 70 mm was molded under conditions of a molding temperature of 160° C., a molding pressure of 70 kg/cm² and a molding time of 3 minutes, followed by post curing in a thermostatic chamber of 180° C. for 4 hours to obtain a test piece. The test piece was subjected to a pressure cooker test under conditions of a temperature of 121° C., an atmospheric pressure of 2 and 500 hours, after which it was removed to determine an increase of the weight from the initial weight as a water absorption.

Crack resistance test:

A silicon wafer having a thickness of 0.35 mm was cut into a rectangular form having a size of 16 mm×4.5 mm and was bonded to a 14 pin IC frame (42 alloys), followed by transfer molding of the respective epoxy resin compostions under molding conditions of 160° C. and 2 minutes and post-curing at 180° C. and 4 hours. Subsequently, the molded article was subjected to cooling and heating cycles in which cycle it was cooled at −55° C. for 30 minutes and then heated at 150° C. for 30 minutes. The number of the cycles were determined before the percent defective of the cracking of the molded resin articles reached 50%.

TABLE

| | Example 1 | 2 | 3 | 4 | 5 | 6 | 7 | Comparative Example |
|---|---|---|---|---|---|---|---|---|
| cresol novolac resin | 42 | 15 | 58 | 39 | 51 | 42 | 24 | 60 |
| brominated epoxy resin | 5 | 5 | 5 | 5 | 5 | 5 | 5 | 5 |
| phenol novolac resin | 33 | 30 | 35 | 26 | 19 | 33 | 31 | 35 |
| fused silica | 250 | 250 | 250 | 250 | 250 | 250 | 250 | 250 |
| $Sb_2O_3$ | 10 | 10 | 10 | 10 | 10 | 10 | 10 | 10 |
| carnauba wax | 1 | 1 | 1 | 1 | 1 | 1 | 1 | 1 |
| carbon black | 1 | 1 | 1 | 1 | 1 | 1 | 1 | 1 |
| silane coupling agent | 1 | 1 | 1 | 1 | 1 | 1 | 1 | 1 |
| triphenylphosphine | 0.7 | 0.7 | 0.7 | 0.7 | 0.7 | 0.7 | 0.7 | 0.7 |
| fluorine-containing modified polymer A | 20 | 50 | 2 | — | — | — | — | — |
| fluorine-containing modified polymer B | — | — | — | 30 | — | — | — | — |
| fluorine-containing modified polymer C | — | — | — | — | 25 | — | — | — |
| fluorine-containing modified polymer D | — | — | — | — | — | 20 | 40 | — |
| spiral flow (inches) | 30 | 28 | 32 | 25 | 29 | 26 | 24 | 38 |
| bending strength (kg/cm²) | 14.0 | 11.5 | 14.7 | 12.0 | 13.0 | 12.5 | 11.5 | 15.4 |
| glass transition point (°C.) | 165 | 163 | 169 | 167 | 167 | 168 | 165 | 169 |
| expansion coefficient (1/°C.) | $1.9 \times 10^{-5}$ | $2.0 \times 10^{-5}$ | $1.9 \times 10^{-5}$ | $1.9 \times 10^{-5}$ | $1.9 \times 10^{-5}$ | $1.8 \times 10^{-5}$ | $1.8 \times 10^{-5}$ | $2.0 \times 10^{-5}$ |
| water absorption (%) | 0.45 | 0.50 | 0.48 | 0.43 | 0.45 | 0.42 | 0.40 | 0.52 |
| crack resistance | 780 | 900 | 430 | over 1000 | 650 | 800 | over 1000 | 350 |

What is claimed is:

1. An epoxy resin composition comprising an epoxy resin, a curing agent for said epoxy resin, and a modified polymer obtaind by reaction between an aromatic polymer and a member selected from the group consisting of monomers, oligomers and polymers each having at least one fluorine atom in one molecule.

2. The epoxy resin composition according to claim 1, wherein said modified polymer is used in an amount of from 1 to 100 parts by weight per 100 parts by weight of the total of said epoxy resin and said curing agent.

3. The epoxy resin composition according to claim 1, wherein said member is an end group-reactive oligomer having the units of the following formula

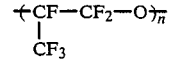

in which n is a value not smaller than 3.

4. The epoxy resin composition according to claim 1, wherein said member is an end group-reactive oligomer having the units of the following formula

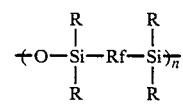

in which Rf represents a fluoroalkylene or fluoroalkylene ether group, each R represents a hydrocarbon group, and n is a value not smaller than 1.

5. The epoxy resin composition according to claim 1, wherein said modified polymer has a content of said member of from 10 to 80% by weight.

6. The epoxy resin composition according to claim 1, further comprising from 150 to 400 parts by weight of silica based on 100 parts by weight of the total of said epoxy resin, said curing agent and said modified polymer.

7. The epoxy resin composition according to claim 1, wherein said modified polymer is used in an amount of from 1 to 50 parts by weight per 100 parts by weight of the total of said epoxy resin and said curing agent.

8. The epoxy resin composition according to claim 1, wherein said epoxy resin has at least two epoxy groups in the molecule.

* * * * *